United States Patent
Katsurahara et al.

(10) Patent No.: US 8,958,973 B2
(45) Date of Patent: Feb. 17, 2015

(54) FUEL INJECTION CONTROL DEVICE FOR ENGINE

(75) Inventors: Hiroshi Katsurahara, Okazaki (JP); Osamu Fukasawa, Nagoya (JP); Tomoaki Nakano, Toyota (JP); Masahiro Yokoi, Kariya (JP); Kota Noguchi, Kariya (JP); Atsushi Koike, Anjo (JP)

(73) Assignee: Denso Corporation, Kariya (JP)

( * ) Notice: Subject to any disclaimer, the term of this patent is extended or adjusted under 35 U.S.C. 154(b) by 827 days.

(21) Appl. No.: 13/163,912

(22) Filed: Jun. 20, 2011

(65) Prior Publication Data

US 2011/0320107 A1  Dec. 29, 2011

(30) Foreign Application Priority Data

Jun. 25, 2010  (JP) .................. 2010-145684

(51) Int. Cl.
F02B 3/00    (2006.01)
F02D 41/40   (2006.01)
F02D 41/14   (2006.01)

(52) U.S. Cl.
CPC .......... F02D 41/402 (2013.01); F02D 41/1454 (2013.01); Y02T 10/44 (2013.01)
USPC ............................ 701/104; 701/103; 123/299

(58) Field of Classification Search
CPC ..... F02M 65/00; F02M 35/001; F02M 45/04; B05B 15/00; G01F 1/6965; F02B 3/06; F02B 2075/125; F02B 2275/14; F02B 17/005; F02B 1/12; F02D 41/3029; F02D 41/389; F02D 41/402; F02D 41/403; F02D 41/405; F02D 41/1454; F02D 41/2454; F02D 41/2461; F02D 41/2441; F02D 41/345; F02D 41/182; F02D 41/2467

USPC ............ 73/114.45, 114.46, 114.48; 701/102, 701/103, 104, 106, 109; 702/100; 123/294, 123/295, 297, 299, 300, 305, 672, 674, 478, 123/480
See application file for complete search history.

(56) References Cited

U.S. PATENT DOCUMENTS

| | | | | | |
|---|---|---|---|---|---|
| 4,962,741 | A | * | 10/1990 | Cook et al. | 123/673 |
| 5,904,128 | A | * | 5/1999 | Shimada et al. | 123/339.12 |
| 5,979,397 | A | * | 11/1999 | Machida et al. | 123/295 |
| 6,116,208 | A | * | 9/2000 | Nishimura et al. | 123/295 |
| 6,240,724 | B1 | * | 6/2001 | Kudou et al. | 60/284 |
| 6,244,241 | B1 | * | 6/2001 | Mamiya et al. | 123/295 |
| 6,257,197 | B1 | * | 7/2001 | Nishimura et al. | 123/295 |

(Continued)

FOREIGN PATENT DOCUMENTS

JP     2011179344 A  *  9/2011

*Primary Examiner* — Hai Huynh
*Assistant Examiner* — Raza Najmuddin
(74) *Attorney, Agent, or Firm* — Nixon & Vanderhye P.C.

(57) ABSTRACT

A fuel injection control device for an engine executes a split injection constructed by a fixed injection and a variable injection. A required injection amount of the fixed injection is set in a low range. A required injection amount of the variable injection is set in a high range. An injection amount in the high range is larger than that of the low range. The required injection amount of the variable injection is changed within the high range while the required injection amount of the fixed injection is fixed when a load of the engine is varied while the split injection is performed. An injection control characteristic is corrected based on an actual air-fuel ratio detected before the load is varied and an actual air-fuel ratio detected after the load is varied.

4 Claims, 3 Drawing Sheets

(56) References Cited

U.S. PATENT DOCUMENTS

| | | | |
|---|---|---|---|
| 6,622,703 B2 * | 9/2003 | Fukui et al. | 123/478 |
| 6,850,835 B1 * | 2/2005 | Barnes et al. | 701/114 |
| 6,962,140 B1 * | 11/2005 | Nakai et al. | 123/436 |
| 6,988,030 B2 * | 1/2006 | Asano et al. | 701/103 |
| 7,073,493 B2 * | 7/2006 | Nakasaka et al. | 123/673 |
| 7,159,547 B2 * | 1/2007 | Nakasaka et al. | 123/90.15 |
| 7,398,772 B2 * | 7/2008 | Nakasaka et al. | 123/568.14 |
| 7,591,243 B2 * | 9/2009 | Idogawa et al. | 123/299 |
| 7,891,337 B2 * | 2/2011 | Takeuchi et al. | 123/436 |
| 8,437,944 B2 * | 5/2013 | Hirata | 701/104 |
| 8,504,278 B2 * | 8/2013 | Verner et al. | 701/109 |
| 2003/0010322 A1 * | 1/2003 | Fukui et al. | 123/478 |
| 2009/0299604 A1 | 12/2009 | Samenfink et al. | |

\* cited by examiner

FUEL INJECTION CONTROL DEVICE FOR ENGINE

CROSS REFERENCE TO RELATED APPLICATION

This application is based on Japanese Patent Application No. 2010-145684 filed on Jun. 25, 2010, the disclosure of which is incorporated herein by reference in its entirety.

BACKGROUND OF THE INVENTION

1. Field of the Invention

The present invention relates to a fuel injection control device for an internal combustion engine.

2. Description of Related Art

Generally, a fuel injection control system of an engine calculates a required fuel injection amount based on an operation state of the engine. A fuel injection valve is driven to open with an injection pulse width (i.e., during an injection period), and the injection pulse width is set based on the required fuel injection amount. Thus, the required amount of fuel is injected.

Compared with a fuel injection valve of a port injection type engine, a fuel injection valve of a cylinder injection type engine is required to inject a large amount of fuel in a short period at a high load time, because high pressure fuel is injected into a cylinder of the cylinder injection type engine. Therefore, a large dynamic range is necessary for the fuel injection valve of the cylinder injection type engine. In this case, it is required to use a low range where a linearity of changing characteristic of actual injection amount is worse with respect to the injection pulse width. If the required fuel injection amount becomes smaller at an engine idling time, for example, a variation in the fuel injection amount becomes larger in the low range where the injection pulse width is small. Specifically, if a difference between the required fuel injection amount and an actual fuel injection amount becomes larger, exhaust emission and drivability may get worse.

JP-A-2009-513864 describes a split injection in which a required injection amount of fuel is injected separatedly between a base injection and a measurement injection. While the split injection is performed, a variation (error) in a fuel injection amount is calculated in a low range based on a difference between a target air-fuel ratio and an actual air-fuel ratio detected by a sensor. A characteristic curve representing a relationship between an injection period and an injection amount is corrected based on the calculated variation. The corrected characteristic curve is used for controlling a fuel injection valve. Thus, the variation in the fuel injection amount can be reduced.

However, if the difference between the target air-fuel ratio and the actual air-fuel ratio is generated by other factor except the variation in the fuel injection amount, an accuracy of the correction becomes low due to the other factor.

Further, under the same operation condition, a system may correct injection control characteristic based on an actual fuel-air ratio of a normal injection and an actual fuel-air ratio of a split injection, when fuel injection is performed by switching the normal injection and the split injection. However, if the operation condition is changed in the correction time, it is impossible to perform the correction, so that a predetermined frequency for performing the correction cannot be secured.

SUMMARY OF THE INVENTION

In view of the foregoing and other problems, it is an object of the present invention to provide a fuel injection control device for an internal combustion engine.

According to an example of the present invention, a fuel injection control device for an engine includes a fuel injection valve to inject fuel; an injection controller to control the fuel injection valve based on a required fuel injection amount corresponding to an operation state of the engine; and a correcting portion to correct an injection control characteristic of the fuel injection valve. The correcting portion includes first means, second means, and third means. The first means execute a split injection in which a fuel injection amount required by a cylinder of the engine is injected separatedly between a fixed injection and a variable injection when a predetermined condition is satisfied. The first means set a required injection amount of the fixed injection per injection in a predetermined low range in which a fuel injection amount is small. The first means set a required injection amount of the variable injection per injection in a predetermined high range in which a fuel injection amount is larger than that of the low range. The second means change the required injection amount of the variable injection per injection within the predetermined high range while the required injection amount of the fixed injection per injection is fixed when a load of the engine is varied while the split injection is performed. The third means correct the injection control characteristic of the fuel injection valve based on an actual air-fuel ratio detected by a sensor before the load is varied and an actual air-fuel ratio detected by the sensor after the load is varied.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

Figure 1:
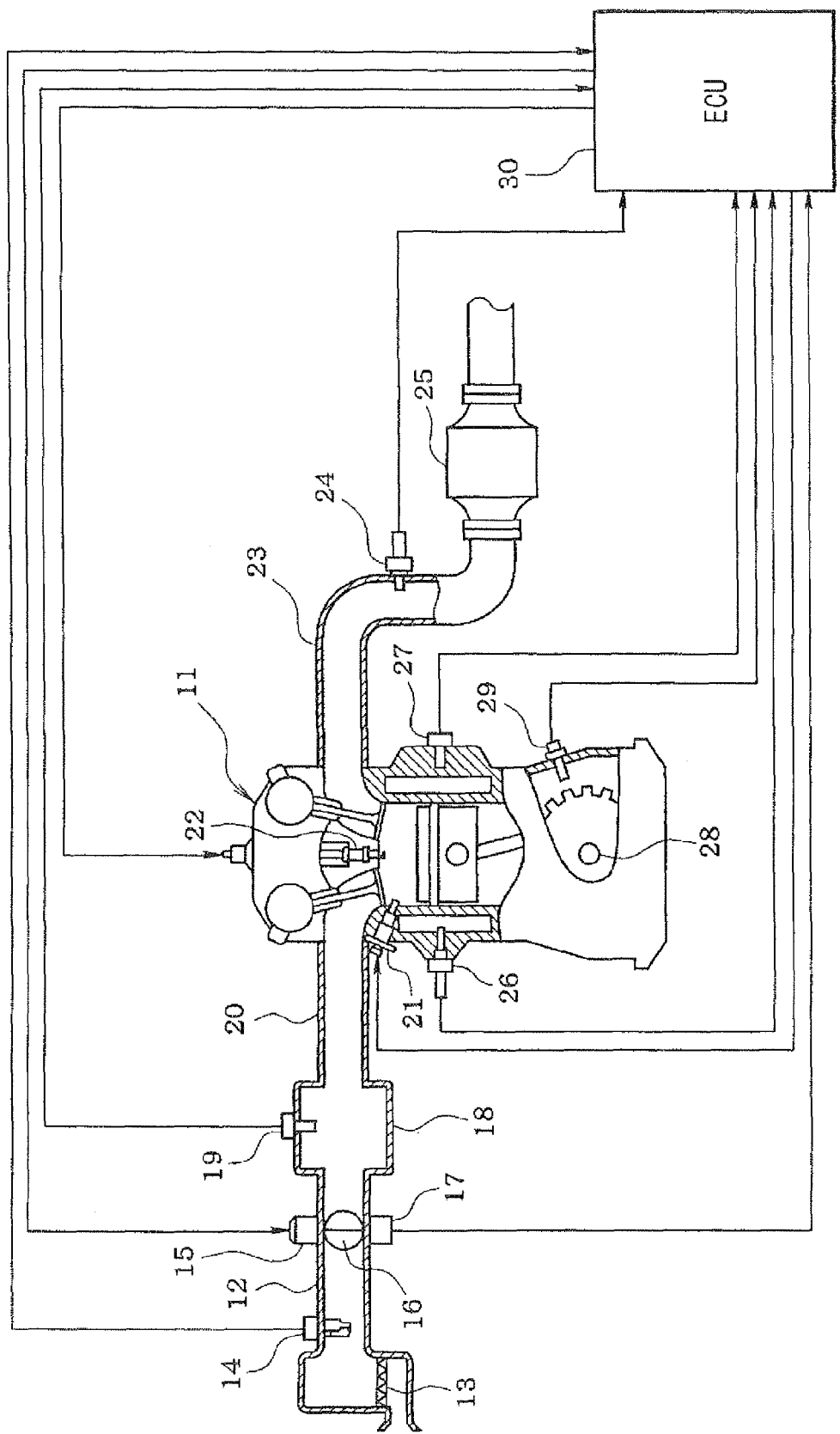
FIG. 1 is a schematic view illustrating an engine control system according to an embodiment.

As shown in FIG. 1, an air cleaner 13 is arranged at the most upstream of an intake tube 12 of a cylinder injection type engine 11. An air flow meter 14 is arranged downstream of the air cleaner 13, and detects a flow rate of intake air. A throttle valve 16 is arranged downstream of the air flow meter 14, and an opening degree of the valve 16 is controlled by a motor 15. A throttle opening sensor 17 detects a throttle opening degree of the throttle valve 16.

A surge tank 18 is arranged downstream of the throttle valve 16, and a pressure sensor 19 is arranged in the surge tank 18. The sensor 19 detects a pressure of the intake tube 12. An intake manifold 20 is arranged on the surge tank 18, and introduces air into each cylinder of the engine 11. A fuel injection valve 21 is arranged at each cylinder of the engine 11, and directly injects fuel into the cylinder. An ignition plug 22 is attached to each cylinder head of the engine 11, and air-fuel mixture in the cylinder is ignited by a spark discharge of the ignition plug 22.

An air-fuel ratio sensor 24 is arranged in an exhaust pipe 23 of the engine 11, and detects an air-fuel ratio of gas exhausted from the engine 11. A ternary catalyst 25 is arranged downstream of the sensor 24, and purifies the exhausted gas.

A temperature sensor 26 and a knock sensor 27 are attached to a cylinder block of the engine 11. The temperature sensor 26 detects a temperature of cooling water, and the knock sensor 27 detects a knocking. A crank angle sensor 29 is arranged on an outer periphery of a crankshaft 28. The sensor 29 outputs a pulse signal every time when the crankshaft 28 is rotated by a predetermined crank angle. A crank angle and an engine rotation velocity are detected based on the output signal of the crank angle sensor 29.

Signals output from the sensors are input into an electronic control circuit 30 (ECU). The ECU 30 is constructed by a microcomputer, and executes a variety of engine controlling programs memorized in a ROM (storage medium) of the ECU 30, thereby controlling a fuel injection amount, an ignition timing, an opening degree of the throttle 16 (intake air amount) based on an operation state of the engine 11.

At this time, the ECU 30 calculates a required injection amount based on the operation state of the engine 11, and calculates an injection pulse width (injection period) based on the required injection amount using a map or formula. The ECU 30 drives to open the fuel injection valve 21 with the injection pulse width, so that the required amount of fuel is injected. The ECU 30 may correspond to an injection controller.

Figure 2:
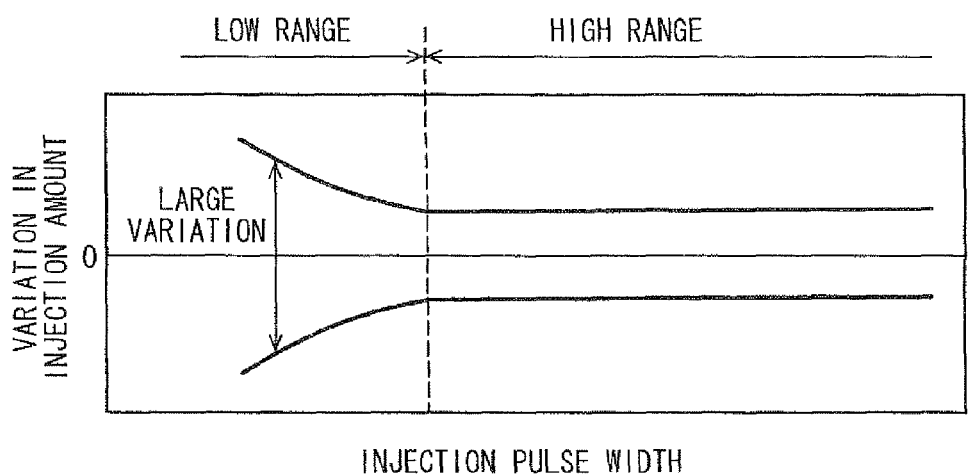
FIG. 2 is a characteristic view illustrating a relationship between an injection pulse width of a fuel injection valve and a variation in an injection amount.

Compared with a fuel injection valve of a port injection type engine, the fuel injection valve 21 of the cylinder injection type engine 11 is required to inject a large amount of fuel in a short period at a high load time, because high pressure fuel is injected into the cylinder of the engine 11. Therefore, a large dynamic range is necessary for the fuel injection valve 21 of the engine 11. In this case, it is required to use a low range where a linearity of changing characteristic of actual injection amount is worse with respect to the injection pulse width. As shown in FIG. 2, if the fuel injection amount becomes smaller at an engine idling time, for example, a variation in the fuel injection amount becomes larger in the low range where the injection pulse width is small. If a difference between the required fuel injection amount and an actual fuel injection amount becomes larger, exhaust emission and drivability may get worse.

Figure 3:
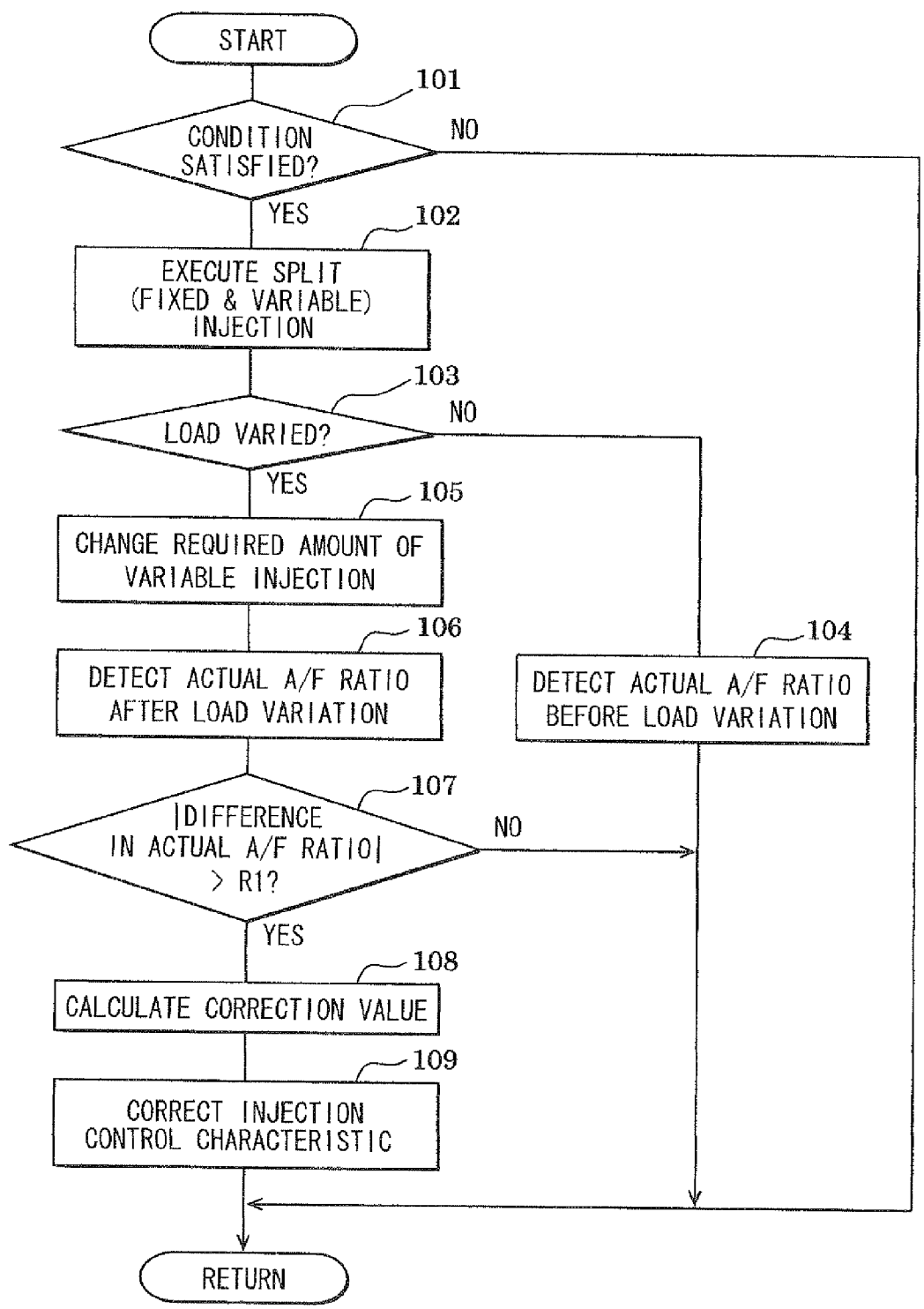
FIG. 3 is a flow chart illustrating a routine of correcting an injection control characteristic.

In this embodiment, the ECU 30 executes a routine of correcting an injection control characteristic, as shown in FIG. 3, thereby correcting the injection control characteristic of the valve 21. The injection control characteristic represents a relationship between the required injection amount and the injection pulse width, for example.

When a predetermined condition is satisfied, a split injection is performed in which a fuel injection amount required by a cylinder of the engine is injected separatedly between a fixed injection and a variable injection. A required injection amount of the fixed injection per injection is set in the low range in which the injection amount is small, and a required injection amount of the variable injection per injection is set in a high range in which the injection amount is larger than that of the low range. A variation in the injection amount is larger in the low range, and is smaller in the high range.

If a load of the engine 11 is varied while the split injection is performed, the fuel injection amount required by the cylinder is changed. At this time, the required injection amount of the variable injection per injection is changed within the high range while the required injection amount of the fixed injection per injection is fixed, so as to maintain a target air-fuel ratio. The injection control characteristic of the fuel injection valve 21 is corrected based on an actual air-fuel ratio detected by the sensor 24 before the load is varied and an actual air-fuel ratio detected by the sensor 24 after the load is varied.

When the split injection is performed, the required injection amount of the fixed injection per injection is set in the low range, and the required injection amount of the variable injection per injection is set in the high range. Therefore, the variation of the fuel amount in the fixed injection is made larger, and the variation of the fuel amount in the variable injection is made ignorably smaller. Thus, the variation of the fuel amount in the fixed injection easily affects the air-fuel ratio while the split injection is performed. That is, the variation of the injection amount in the low range easily affects the air-fuel ratio while the split injection is performed.

Further, if the load of the engine 11 is varied while the split injection is performed, the fuel injection amount required by the cylinder is changed. At this time, the required injection amount of the variable injection per injection is changed within the high range while the required injection amount of the fixed injection per injection is fixed. Therefore, a degree of affecting the air-fuel ratio by the variation of the fuel amount in the fixed injection can be changed. A factor affecting the air-fuel ratio other than the variation of the fuel amount in the fixed injection can be cancelled by comparing the actual air-fuel ratio detected before the load is varied and the actual air-fuel ratio detected after the load is varied with each other. That is, the variation of the fuel amount in the fixed injection can be extracted, so that the variation of the injection amount in the low range can be obtained.

Therefore, the injection control characteristic of the valve 21 can be corrected using both of the actual air-fuel ratio detected before the load variation and the actual air-fuel ratio detected after the load variation, in a manner that the variation of the injection amount in the low range is reduced.

Details of the routine of correcting the injection control characteristic performed by the ECU 30 will be described with reference to FIG. 3.

The routine is repeatedly performed with a predetermined period while the ECU 30 is activated, and may correspond to a correcting portion to correct the injection control characteristic. When the routine is activated, it is determined whether a predetermined condition is satisfied at Step 101. The predetermined condition includes a first condition and a second condition. The predetermined condition is satisfied if both of the first condition and the second condition are satisfied.

The first condition is satisfied when the air-fuel ratio sensor 24 is activated. The second condition is satisfied when the engine 11 has an operation state in a manner that the injection amount required by the single cylinder is larger than a lower limit of the high range. For example, when the required fuel injection amount is located around a center of the high range of FIG. 2, for example, the second condition is satisfied.

The split injection is allowed to be performed if the second condition is satisfied.

If at least one of the first condition and the second condition is not satisfied, the predetermined condition of Step 101 is not satisfied.

If it is determined that the predetermined condition is not satisfied at Step 101, the routine is ended without performing Step 102-109.

If the predetermined condition is satisfied at Step 101, the split injection is executed at Step 102, so that the fuel injection amount required by the cylinder of the engine is injected separatedly between the fixed injection and the variable injection. At this time, the required injection amount of the fixed injection per injection is set in the low range, and the required injection amount of the variable injection per injection is set in the high range.

The required injection amount of the fixed injection per injection is set as the minimum value injectable by the valve 21 or is set slightly larger than the minimum value, for example. That is, the required injection amount of the fixed injection per injection is set within an area in which the injection control characteristic is corrected. In contrast, the required injection amount of the variable injection per injection is set by subtracting the required injection amount of the fixed injection per injection from the injection amount required by the cylinder.

It is determined whether the load of the engine 11 is varied at Step 103 based on the flow rate of intake air or the pressure of the intake tube 12, for example When the load of the engine 11 is determined to have no variation, the required injection amount of the variable injection and the required injection amount of the fixed injection are fixed, and the actual air-fuel ratio detected by the sensor 24 is memorized as a value before the load is varied at Step 104.

If the load of the engine 11 is determined to have a variation at Step 103, the required injection amount of the variable injection per injection is changed by an amount generated by the variation in the load of the engine per cylinder while the required injection amount of the fixed injection per injection is fixed, so as to maintain a target air-fuel ratio at Step 105. The actual air-fuel ratio detected by the sensor 24 is memorized as a value after the load is varied at Step 106.

An absolute value of a difference between the value before the load is varied and the value after the load is varied is determined to be larger than a threshold R1 or not at Step 107.

If the absolute value is determined to be larger than the threshold R1 at Step 107, a correction value is calculated at Step 108 based on the difference between the value before the load is varied and the value after the load is varied so as to reduce the variation of the fuel injection amount in the fixed injection.

The injection control characteristic of the valve 21 is corrected using the correction value at Step 109. For example, a map or formula calculating the injection pulse width in accordance with the required injection amount is corrected using a map or formula defining a relationship between the required injection amount and the injection pulse width. Alternatively, the correction may be performed to the injection pulse width calculated based on the required injection amount, or may be performed to the required injection amount used for calculating the injection pulse width.

If the absolute value is determined to be equal to or smaller than the threshold R1 at Step 107, it is determined that the correction is unnecessary, so that the routine is ended.

According to the embodiment, the injection control characteristic of the valve 21 can be accurately corrected, and the variation in the injection amount of the valve 21 can be made smaller. Further, the injection control characteristic of the valve 21 can be accurately corrected even if the load of the engine 11 is varied. Therefore, a frequency of performing the correction of the injection control characteristic can be sufficiently secured.

The split injection is constructed by the single fixed injection and the single variable injection in the above description. However, the number of the fixed injections is not limited to one, or the number of the variable injections is not limited to one. The number of the fixed injections and the number of the variable injections may be changed in accordance with the required injection amount, for example. The number of the fixed injections may be two or more, and the number of the variable injections may be two or more.

The correction value is not limited to be calculated based on the difference between the actual air-fuel ratio detected before the load is varied and the actual air-fuel ratio detected after the load is varied. The correction value may be calculated based on a ratio of the actual air-fuel ratio detected before the load is varied to the actual air-fuel ratio detected after the load is varied.

The split injection may be performed in each of the cylinders, and the correction of the injection control characteristic may be performed in each of the cylinders.

The present invention may be applied to an intake port type engine without being limited to the cylinder injection type engine 11.

Such changes and modifications are to be understood as being within the scope of the present invention as defined by the appended claims.

What is claimed is:
1. A fuel injection control device for an engine comprising:
   a fuel injection valve to inject fuel;
   an injection controller to control the fuel injection valve based on a required fuel injection amount corresponding to an operation state of the engine; and
   a correcting portion to correct an injection control characteristic of the fuel injection valve, wherein
   the correcting portion includes
      first means for executing a split injection in which a fuel injection amount required by a cylinder of the engine is injected separatedly between a fixed injection and a variable injection when a predetermined condition is satisfied, the first means setting a required injection amount of the fixed injection per injection in a low range in which an injection amount is small, the first means setting a required injection amount of the variable injection per injection in a high range in which an injection amount is larger than that of the low range,
      second means for changing the required injection amount of the variable injection per injection within the high range while the required injection amount of the fixed injection per injection is fixed when a load of the engine is varied while the split injection is performed, and
      third means for correcting the injection control characteristic of the fuel injection valve based on an actual air-fuel ratio detected by a sensor before the load is varied and an actual air-fuel ratio detected by the sensor after the load is varied.

2. The fuel injection controlling device according to claim 1, wherein
   the injection controller sets an injection pulse width in accordance with the required injection amount, and drives the fuel injection valve with the injection pulse width, and
   the correcting portion corrects the injection control characteristic of the fuel injection valve by correcting a relationship between the required injection amount and the injection pulse width.

3. The fuel injection controlling device according to claim 1, wherein
   the first means are allowed to execute the split injection if a fuel injection amount required by a cylinder of the engine per injection becomes larger than a lower limit of the high range.

4. The fuel injection controlling device according to claim 2, wherein the first means sets the required injection amount of the fixed injection per injection in the low range where a linearity of changing characteristics of actual injection amount is worse with respect to the injection pulse width.

\* \* \* \* \*